July 16, 1963 A. G. MAKOWSKI ETAL 3,097,593
APPARATUS FOR HANDLING AND TREATING TUBULAR PLASTIC CONTAINERS
Filed March 31, 1959 6 Sheets-Sheet 1

Fig.1

INVENTORS
ALEXANDER GEORGE MAKOWSKI
ARTHUR JORDAN BLOOD
JOHN MOSS WATHEN, JR.
BY Leland R. McCann
George W. Reiber
ATTORNEYS United States Patent Office 3,097,593
Patented July 16, 1963

3,097,593
APPARATUS FOR HANDLING AND TREATING TUBULAR PLASTIC CONTAINERS
Alexander George Makowski, Fayville, Arthur Jordan Blood, Framingham, and John Moss Wathen, Jr., Bedford, Mass., assignors to American Can Company, New York, N.Y., a corporation of New Jersey
Filed Mar. 31, 1959, Ser. No. 803,250
9 Claims. (Cl. 101—38)

The present invention relates to apparatus for handling and treating tubular elements or sleeves, for example, plastic container bodies and the like, and has particular reference to devices for loading such container bodies into printing and other machines and for transferring the containers from the machine to a transfer device.

The invention is particularly adapted to the printing or exterior decorating of headless tubular container bodies made of polyethylene or similar plastic materials, the bodies being of the character used in shaving cream or the like containers. In the manufacture of such containers it has been the practice to form heads on the bodies prior to any other operations. The heads stiffen the otherwise flimsy and difficult to handle bodies and hold them expanded during handling. The heads also are frequently used as handle portions to grip and handle the containers for subsequent operations.

However the heads on the bodies interfere with the proper support of the bodies during printing and decorating operations and this results in limiting the area of the bodies which can be printed and often results in what is commonly called corkscrew or spiral printing. The heads on the bodies also limit the operations to single bodies, whereas it is frequently more economical to provide long tubes which can be printed in multiple and subsequently cut into single body lengths. Transfer of the bodies from one machine to another is also limited because of the heads on the bodies.

As a result of these disadvantages it has become possible through the instant invention, to print and perform other operations on the container bodies, either singly or in multi-body tubes and to affix the heads to the bodies after all the other operations, except filling, have been completed.

It is an object of the instant invention to provide an apparatus for readily handling headless tubular plastic container bodies and the like which are difficult to handle because of their flexibility and flimsiness.

Another object is the provision of such an apparatus which permits of movement of flimsy container bodies in processional order and the transfer of the bodies to a mandrel for a subsequent treatment.

Another object is the provision of such an apparatus which feeds the bodies endwise onto mandrels in such a manner as to produce a tight fit to insure against rotation of the bodies relative to the mandrels during the treating operations.

Another object is the provision of such an apparatus wherein the mandrels can be fully supported against deflection during the treating operation so as to prevent corkscrew printing and the like irregularities.

Another object is the provision of such an apparatus wherein the bodies may be precisely located on the mandrels prior to a treating operation and wherein the bodies may be readily stripped from the mandrels and transferred to a transfer device.

Numerous other objects and advantages of the invention will be apparent as it is better understood from the following description, which, taken in connection with the accompanying drawings, discloses a preferred embodiment thereof.

Referring to the drawings.

As a preferred and exemplary embodiment of the instant invention, the drawings disclose a machine or apparatus for printing the exterior surface of cylindrical, tubular container bodies A (FIGS. 2 and 3) which may be single bodies or a tube to be subsequently divided into a plurality of bodies and preferably made from polyethylene or other plastic material.

Figure 8:
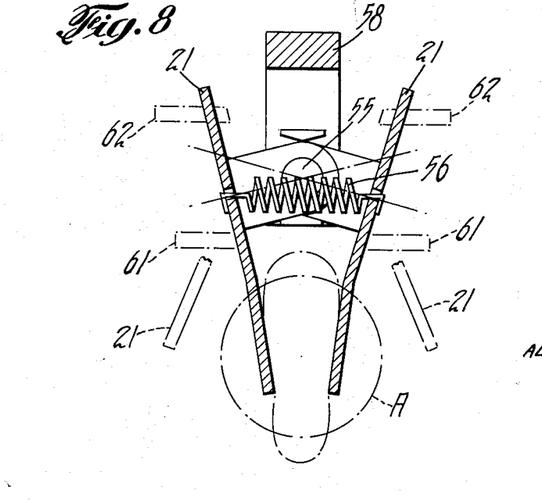
FIG. 8 is an enlarged sectional detail as viewed substantially along the line 8—8 in FIG. 6.
Figure 9:
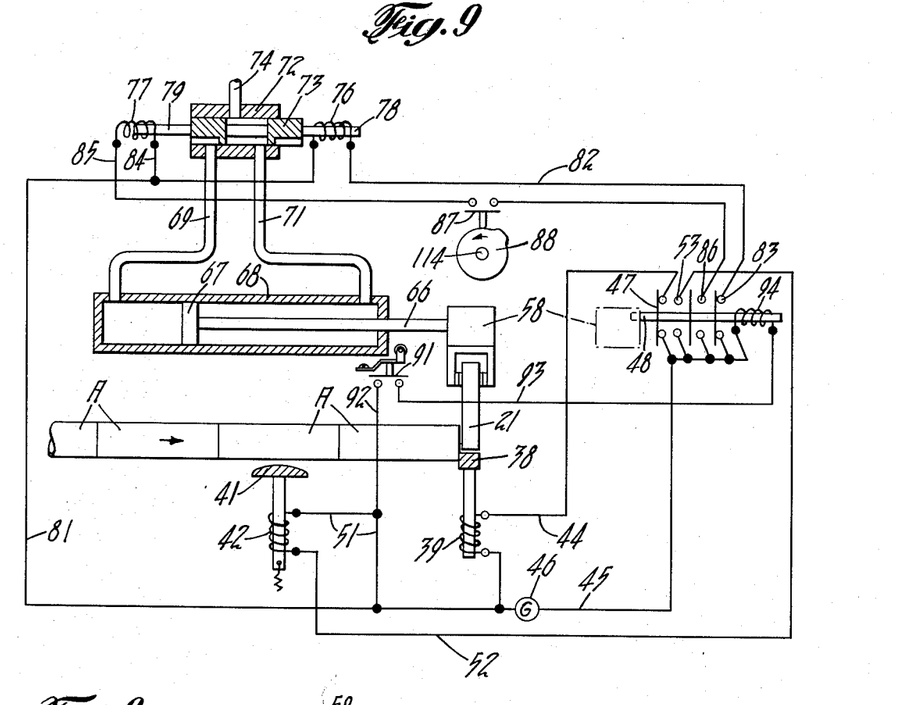
FIG. 9 is a schematic view of principal parts shown in FIG. 6 and a wiring diagram of the connecting electrical apparatus.

The bodies A are pre-formed as by extrusion or other suitable process and are fed to the printing machine in a substantially continuous procession, arranged in end-to-end relation as best shown in FIG. 9. At the machine, the leading body A is picked up by fingers 21 (FIGS. 8 and 9) while the remaining bodies in the procession are held back. The picked-up body A is carried to an advanced position where it is released and dropped into a locating and holding hopper 22 (FIGS. 1 and 6) disposed in endwise alignment with a path of travel of a plurality of cantilever mandrels 23 (FIG. 2) carried on an intermittently rotatable disc 24.

Each body A as it is received in the hopper 22 is pushed endwise onto a mandrel 23 and is then precisely located longitudinally of the mandrel and in this position is carried past a rotary printing drum 25 (FIG. 2) for printing. After printing the body A is carried to a discharge station 26 (FIGS. 1 and 4) where it is stripped off the mandrel and is transferred to a transfer conveyor 27 (FIG. 4) which carries the printed body to any suitable place of deposit for a subsequent operation.

Referring to the drawings in detail, the procession of headless, open end tubular bodies A is supported on the upper run of a continuously operated, horizontally disposed endless belt 31 (FIGS. 3, 6 and 7) which adjacent the printing machine operates over a drive pulley 32 suitably supported in a subframe 33 and rotated in any suitable manner. A short continuing table 34 is provided to support a body advanced beyond the belt 31. Side guides 36 disposed adjacent the edges of the top run of the belt retain the bodies A in processional order. The continuously operating belt 31 carries the entire procession of bodies A forward toward the printing machine and thus causes the leading body A to be pushed beyond the belt and onto the table 34 into a position where its leading edge engages a movable stop element 38 temporarily disposed in the path of travel of the body and actuated by an electric solenoid 39 (see FIG. 9).

Figure 6:
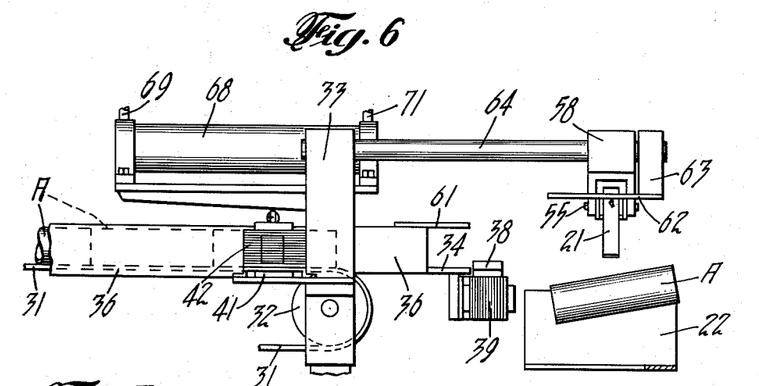
FIG. 6 is a side elevation of the devices shown at the upper left in FIG. 3, with certain of the parts in a different position.
Figure 7:
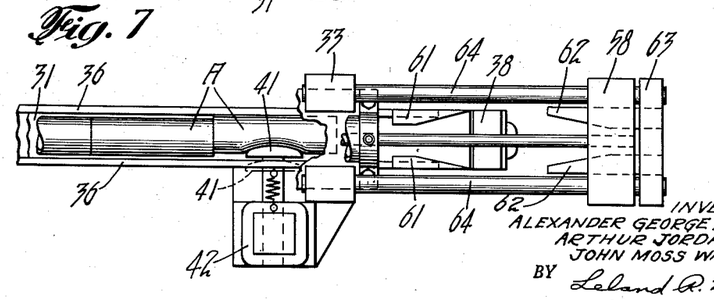
FIG. 7 is a top plan view of the devices shown in FIG. 6.

Engagement of the leading body A by the stop element 38 temporarily arrests the advancement of the procession of bodies. This action is immediately followed by actuation of a holding or pressure member 41 (FIGS. 3, 6, 7 and 9) which moves into position against the next to the leading body A as best shown in FIG. 7 and slightly squeezes this body against the opposite side guide 36 to hold back the procession of bodies while leaving the leading body free. At this time the free leading body A is gripped by the fingers 21 hereinbefore mentioned, which pick up the body and deposit it in the hopper 22. The stop element 38 is retracted to permit this movement of the free leading body.

The pressure member 41, like the stop element 38, is actuated by an electric solenoid 42. The two solenoids 39, 42 are spring loaded in a retracting direction and are energized alternately to effect their required sequence of operation. The stop element solenoid 39 is normally energized to normally hold the stop element 38 in its stop functioning position as shown in FIG. 9. Energization of this solenoid 39 is effected preferably through wires 44, 45 (FIG. 9) which connect with a suitable source of electric current such as a generator 46 and with a normally closed switch 47 which is one of a plurality of switches actuated by a common actuating bar 48.

The pressure member solenoid 42 is normally deenergized and is energized to push the pressure member 41 into holding position as shown in FIG. 7, only when the step element solenoid 39 is deenergized. For this purpose the solenoid 42 is connected by a wire 51 to the generator 46 and by a wire 52 to one side of a normally open switch 53 controlled by the switch bar 48. The other side of the open switch is connected to the wire 45. Hence when the switch bar 48 is shifted, as will be hereinafter explained, it opens switch 47 and closes switch 53 and vice versa to control the operation of the stop element 38 and the pressure member 41 in sequence as hereinbefore explained.

The body pick-up fingers 21 comprise a pair of oppositely disposed substantially flat blades as shown in FIG. 8 which are separately mounted on a pivot pin 55 (FIG. 8) and which are spring loaded by a toggle effect tension spring 56 connected between them near the center of the pivot pin 55 so that in a closed position as shown in FIG. 8 the spring is below the pivot pin to hold the fingers closed and in an open position the spring is above the pivot pin to hold the fingers open.

The fingers 21 are carried in a head 58 (FIG. 9) which is movable in a horizontal direction, toward and away from the hopper 22 of the printing machine, and parallel with and above the line of travel of the procession of bodies A. Pairs of stationary cams 61, 62 (FIGS. 3, 6 and 7) disposed on opposite sides of the fingers 21, below and above the level of the pivot pin 55, as shown in FIG. 8, control the opening and closing of the fingers as the head 58 reciprocates. The lower cams 61 are mounted on the belt side guides 36 while the upper cams 62 are secured to a block 63 mounted on a pair of horizontal support rods 64 projecting from the subframe 33.

Figure 3:
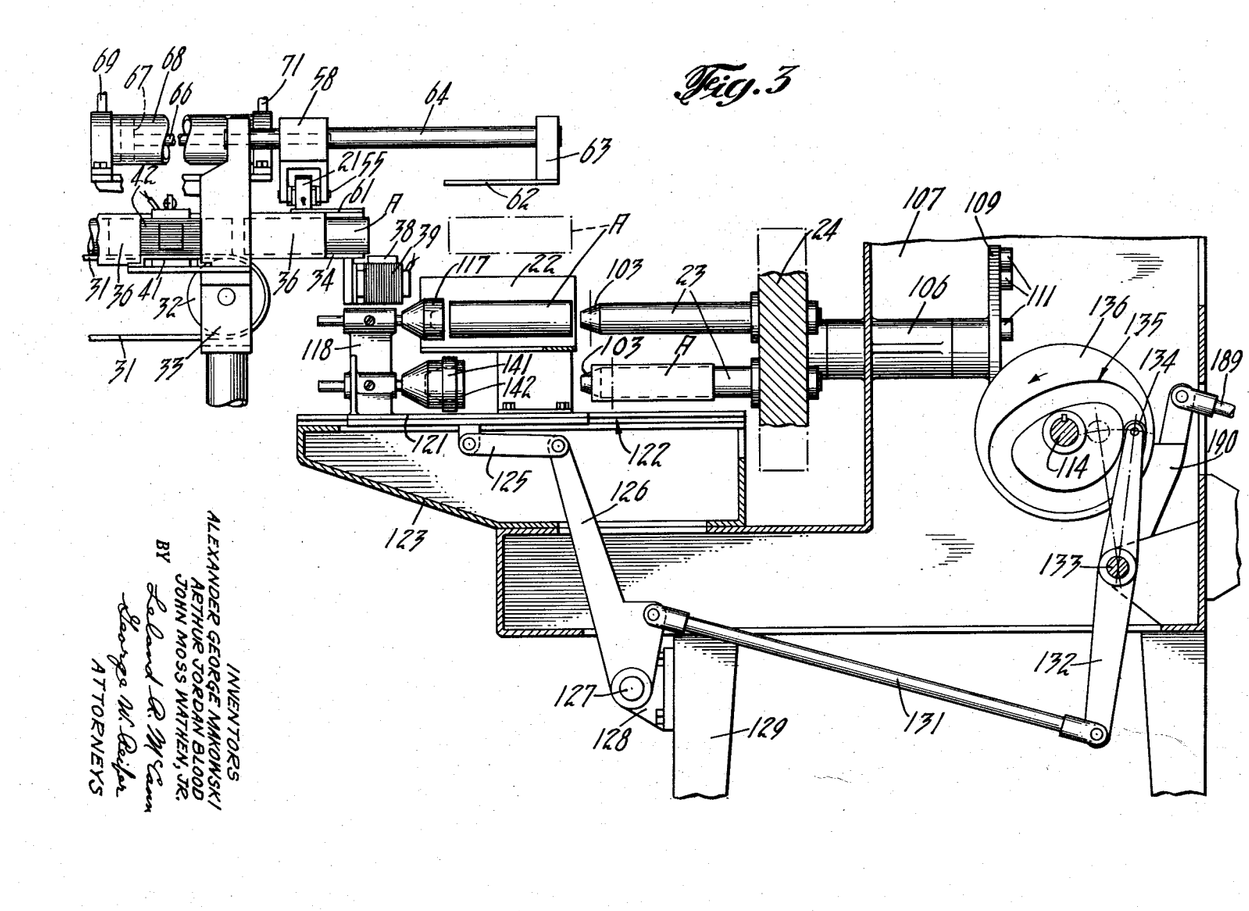
FIGS. 3 and 4 are sectional views taken substantially along the vertical lines 3—3 and 4—4 in FIG. 1, with parts broken away.

When the head 58 moves back into the retracted position as shown in FIG. 3 the lower cams 61 close the fingers 21 on the free leading body A and grip it as shown in FIG. 8 so as to carry it forward to the hopper 22. When the head 58 is advanced to a position over the hopper 22 as shown in FIG. 6 the upper cams 62 open the fingers 21 and thereby effect the release of the body to the hopper.

The movement of the head 58 is effected preferably by fluid pressure. For this purpose the head 58 is mounted on the outer end of a piston rod 66 carrying a piston 67 operating in a fluid pressure cylinder 68 secured to the belt pulley subframe 33 (see FIG. 3). The head 58 slides on and is guided by the support rods 64. The ends of the cylinder 68 are connected by pipes 69, 71 (FIG. 9) to a valve housing 72 containing a reciprocable slide valve 73 and a common pipe 74 which leads to a suitable source of fluid under pressure.

Movement of the slide valve 73 preferably is effected by a pair of oppositely disposed electric solenoids 76, 77 which surround respective core elements 78, 79 which project from the ends of the slide valve. Solenoid 76 is connected by a wire 81 to the generator 46 and by a wire 82 to a normally closed switch 83 controlled by the common actuating bar 48 and connected by wire 45 to the generator. The solenoid 77 is connected by a wire 84 to the wire 81 and by a wire 85 to a normally open switch 86 on the bar 48 and connected by wire 45 to the generator. Between the solenoid 77 and the switch 86, the wire 85 is connected to a normally open timing switch 87 which is actuated by a continuously rotating edge cam 88 mounted on and rotating with the main shaft of the machine as will be hereinafter explained.

Control of the reciprocation of the finger head 58 is partially effected by the closing of the timing switch 87 and partially through the closing of a normally open switch 91 which is actuated by the head 58 itself. The switch 91 is connected by a wire 92 to the generator 46 and by a wire 93 to an electric solenoid 94 which surrounds and actuates the common switch bar 48. The solenoid 94 is also connected to the generator wire 45.

When the head 58 is returning, that is, moving in a direction toward the left as viewed in FIG. 9, to complete a cycle of operation, it engages and closes the control switch 91. At this time, at the end of a cycle of operation, switch 47 is closed as shown in FIG. 9 and its solenoid 39 is energized to hold the stop element 38 in projected position and the leading body A is engaged against the stop element. Switch 53 is open and its solenoid 42 is deenergized. The pressure member 41 is thus in a retracted relation as in FIG. 9. Switch 83 is closed and its solenoid 76 is energized to hold the slide valve 73 is position to effect return if the finger head 58. Switch 86 and switch 87 are open and therefore solenoid 77 is deenergized.

With the various switches 47, 53, 83, 86, 87 in this cycle-ending relation mentioned above, the closing of the control switch 91 energizes its solenoid 94 and thus shifts the common switch bar 48 toward the left as viewed in FIG. 9 to change the relation of the switches and thereby terminate the cycle of operation and start a new cycle. Thus, the closing of the control switch 91 opens switch 47 to deenergize solenoid 39 to effect retraction of the stop element 38 and thereby free the leading body A. At the same time switch 53 is closed to energize its solenoid 42 and effect projection of the pressure member 41 to hold back the procession of bodies A. Switch 83 is also opened to deenergize its solenoid 76 to release the slide valve 73. However, the slide valve 73 remains in its last position because the timing switch 87 remains open, and although switch 86 is now closed its solenoid 77 remains deenergized.

The cycle of operation of this body feeding device is effected between intermittent or indexing rotations of the machine disc 24 which carries the body support mandrels 23 as hereinbefore mentioned. Hence, the start of a new cycle of the feeding device begins as soon as the disc rests after a partial rotation. Just before this rest period of the disc 24, the edge cam 88 (FIG. 9) closes the timing switch 87 for a period just long enough to effect the energizing of the slide valve solenoid 77, through the switch 86 which was closed at the end of the previous cycle.

The energizing of the valve solenoid 77, shifts the slide valve 73 toward the left as viewed in FIG. 9 and thereby causes the fluid pressure medium from pipe 74 to flow into the cylinder 68 at its left end and to actuate the piston 67 and the finger head 58 through a feeding stroke, toward the right as viewed in FIG. 9. Although the solenoid 77 is only momentarily energized, the shifted valve 73 remains in its shifted position until the opposing solenoid 76 is energized as will be hereinafter explained.

The feeding movement of the finger head 58 opens the control switch 91 and thereby deenergizes the solenoid 94.

The switch rod 48 however remains in its previously shifted position. During this feeding stroke the head 58 carries the leading body A to a position over the hopper 22 and drops it into the hopper as mentioned hereinbefore. At the end of this feeding stroke, the head 58 engages the projected end of the common switch bar 48 and pushes the bar back into its original position as shown in FIG. 9. This action opens the switches 53, 86 and closes the switches 47, 83.

The opening of switch 53 deenergizes its connected solenoid 42 to retract the pressure member 41 and thereby permit the procession of bodies A to move forward to free the next leading body in the procession.

The opening of switch 86 cuts out the line to the valve solenoid 77 which is already disconnected because of the open timing switch 87.

The closing of switch 47 reenergizes the solenoid 39 to project the stop element 38 into the path of the moving bodies A to stop and locate the leading body for pick-up by the feed fingers 21 on the head 58.

The closing of switch 83 reenergizes the valve solenoid 76 to shift the slide valve 73 into the position shown in FIG. 9 and thereby effect the return stroke of the head 58 and the feed fingers 21 attached thereto. When the head 58 is fully returned it again closes the control switch 91 to terminate the cycle of operation of the feeding device and to set the stage for the next cycle of operation which takes place after the next partial rotation of the mandrel disc 24 and the closing of the timing switch 87 as hereinbefore mentioned.

Figure 1:
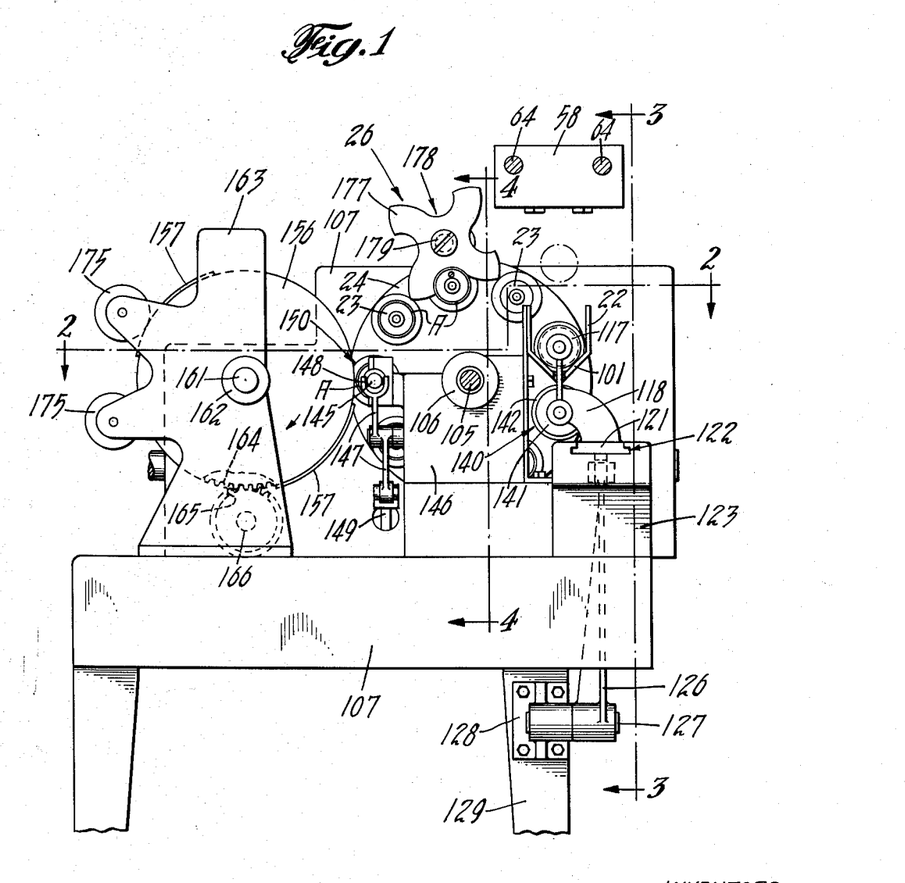
FIG. 1 is a side elevation of an apparatus embodying the instant invention.
Figure 2:
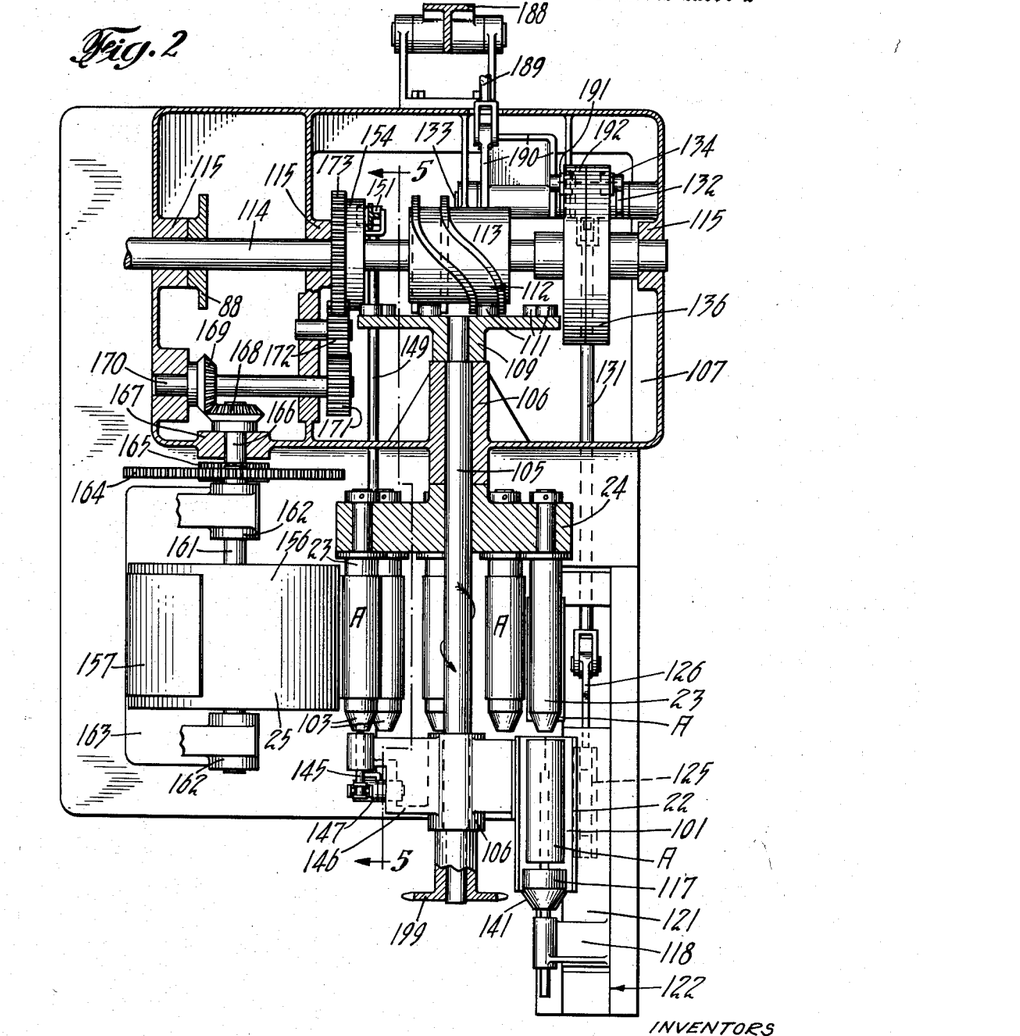
FIG. 2 is a horizontal sectional view taken substantially along the broken line 2—2 in FIG. 1.

The hopper 22 is a trough shaped device having a V shaped bottom 101 (FIG. 1) adapted to receive and hold a container body A in a horizontal position in endwise relation to the path of travel of the mandrels 23 on the rotatable disc 24 as best shown in FIGS. 1, 2 and 3. There are a plurality of the mandrels 23 arranged in circular formation and having one end, the right as viewed in FIG. 3, freely and rotatably mounted in the disc 24 in cantilever fashion. Each mandrel is cylindrical and of a diameter sufficient to receive a container body A with a snug fit to prevent rotation of the body relative to the mandrel. The outer ends of the mandrels 23 preferably are provided with cone shaped or tapered noses 103 to facilitate telescoping of the bodies onto the mandrels.

The mandrels 23 are adapted to be brought in succession into endwise alignment with the hopper 22 to receive a container body A therefrom for subsequent operations. For this purpose the mandrel disc 24 is mounted on a rotatable shaft 105 (FIGS. 1, 2 and 4) which is journaled in bearings 106 formed in a frame 107 which constitutes the main frame of the apparatus.

Rotation of the disc 24 is effected by an indexing device which comprises an indexing wheel 109 (FIGS. 2, 3 and 4) which carries a plurality of rollers 111, one for each mandrel 23, operable in an interrupted groove 112 of a rotatable indexing barrel cam 113 mounted on a shaft 114 which constitutes the main drive shaft of the apparatus. The drive shaft 114 is journaled in bearings 115 in the main frame 107 and is rotated continuously in any suitable manner. The main shaft 114 carries the timing cam 88 (FIGS. 2 and 9) which times the start of the body feeding cycle hereinbefore explained.

When a mandrel 23 is indexed into position adjacent the hopper 22, it is substantially in axial alignment with a container body A in the hopper. While the mandrel is in this position, with the disc 24 at rest, and during the feeding cycle for the next body A, the body A in the hopper is pushed onto the aligned mandrel. This operation is effected by a pusher member 117 (FIGS. 1, 2 and 3) which is disposed in the hopper 22 and is mounted on a bracket 118 of a slide 121 horizontally disposed in a slideway 122 formed in a bed 123 on the machine frame 107. The slide 121 is reciprocated toward and away from the mandrels 23 in time with the indexing operation, by a link 125 which connects the slide to the upper end of an actuating arm 126 mounted on a pivot pin 127 in a bracket 128 attached to a leg 129 of the machine frame.

The arm 126 is rocked by a link 131 which connects the arm to a lever 132 mounted on a pivot shaft 133 in the machine frame. The lever 132 carries a cam roller 134 which operates in a cam groove 135 of a face cam 136 mounted on and rotating with the main drive shaft 114.

The pusher member 117 is axially aligned with a mandrel 23 indexed into position adjacent the hopper 22 and its face is recessed to fit over and clear the tapered nose 103 of the mandrel. Hence when the slide 121 is moved toward the positioned mandrel 23, the pusher member 117 advances through the hopper 22 and engages and pushes the body A along the V shaped bottom of the hopper and onto the aligned mandrel in telescoping fashion. Due to the fact that the body A is rather flimsy and flexible and that a fairly snug fit is desired, no attempt is made to locate the body but to merely telescope it over the mandrel for a major portion of its length.

With the body A positioned on the mandrel 23, the mandrel is indexed to a locating station 140 (FIG. 1) where the body is pushed further along the mandrel into a precisely located position in preparation for printing. This locating operation is effected by a locating member 141 carried on the bracket 118 of the slide 121 and having a ring 142 for engagement against the end of the body. The ring 142 is axially aligned with the mandrel 23 at the locating station and is close slip fit thereover so that with the reciprocation of the slide 121 through a forward stroke it is adapted to engage the end of the body and push the body further onto the mandrel into a precise location longitudinally of the mandrel. Thus one forward movement of the slide 121 effects two operations, the telescoping of one body onto one mandrel at the hopper station and the precise location of a previously received body on an advanced mandrel at the advanced or locating station.

Figure 5:
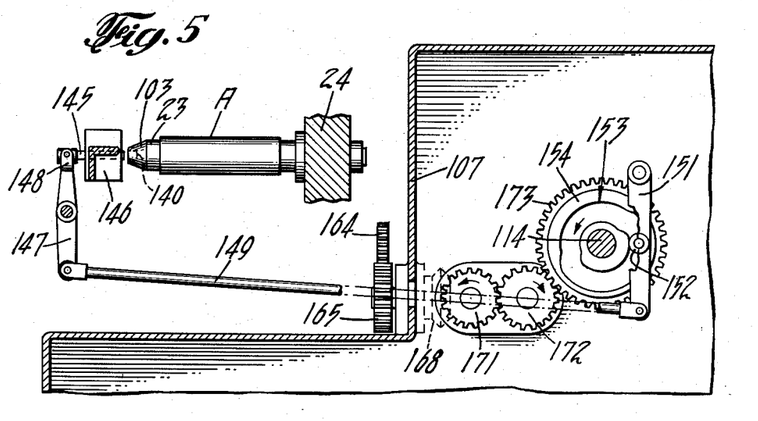
FIG. 5 is a fragmentary sectional view taken substantially along the broken line 5—5 in FIG. 2.

With the body A precisely located on its mandrel 23, the mandrel is indexed through a plurality of idle stations to a printing station 150 (FIG. 1) where the exterior surface of the body is printed. For this printing operation, the outer end of the mandrel 23 is supported to insure accurate printing and prevent corkscrewing or other damage to the body through flexure of the mandrel. For this purpose there is provided a support pin 145 (FIGS. 1, 2 and 5) which is disposed in axial alignment with a mandrel 23 indexed into the printing station. The support pin 145 is slidably mounted in a bearing of a bracket 146 mounted on the machine frame 107. This bracket 146 also supports one end of the indexing wheel shaft 105 and supports the hopper 22.

The inner end of the support pin 145 is adapted to be projected into a bearing 140 in the nose 103 of the mandrel to provide a rigid support for this otherwise unsupported end of the mandrel. Movement of the support pin 145 preferably is effected by a lever 147 having a yoke 148 at its upper end to connect with the support pin. The lever 147 is pivotally mounted on the bracket 146. At its lower end the lever 147 is connected by a link 149 (FIG. 5) to a pivotally mounted cam arm 151 carrying a cam roller 152 which operates in a groove 153 of a face cam 154 mounted on the main shaft 114 and thus rotating in time with the other moving parts of the machine.

The printing of the located and fully supported container body A on the mandrel 23 may be effected in any suitable manner. By way of example, FIGS. 1 and 2 of the drawings show a rotatable printing drum 156 carrying printing plates 157 which are adapted to frictionally engage against and rotate the body A with its mandrel 23 to transfer to the body the desired printing or decoration. The drum 156 is mounted on a horizontal shaft 161 disposed parallel with the mandrel 23 and journaled in bearings 162 in a bearing bracket 163 mounted on the machine frame 107.

The printing drum 156 is continuously rotated from the main drive shaft 114 through a train of gears which comprise a drum gear 164 (FIG. 2) mounted on the drum shaft 161 and meshing with a pinion 165 mounted on a short shaft 166 journaled in a bearing 167 in the machine frame 107. The short shaft 166 carries a bevel gear 168 which meshes with and is driven by a bevel gear 169 on a transfer shaft 170 journaled in bearings in the machine frame. One end of the transfer shaft 170 carries a spur gear 171 which meshes with an idler gear 172 which in turn meshes with and is driven by a drive gear 173 mounted on and rotating with the main drive shaft 114 (see also FIG. 5). Through this connection the printing drum 156 is rotated in time with the other moving parts of the machine. A pair of ink applying rollers 175 (FIG. 1) which receive ink from any suitable source of supply is provided adjacent the periphery of the printing drum 156 to apply ink to the plates 157.

Figure 10:
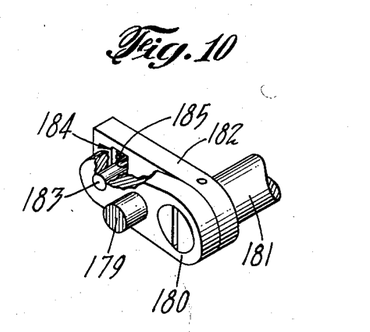
FIG. 10 is a perspective view showing a detail of the apparatus.

With the container body A fully printed, the support pin 145 is withdrawn and the mandrel 23 is indexed through an idle station and is then brought to rest at the discharge station 26. At this station a yieldably mounted star wheel 177, having pockets 178 which closely engage around a portion of the outer periphery of the mandrel behind the container body A thereon, is disposed in the path of travel of the mandrels. The star wheel 177 is engaged and rotated by the mandrel 23 as the mandrel moves into the discharge station. This insures a good fit of the wheel pocket around the mandrel. For this purpose the star wheel 177 is freely mounted on a pivot screw 179 secured in a short arm 180 (FIGS. 4 and 10) pivotally carried on one end of a slide bar 181 disposed in parallelism with the mandrel 23. The short arm 180 is disposed adjacent a similar short arm 182 which is secured to the end of the slide bar 181. The short arm 180 carries a laterally extending pin 183 (FIG. 10) which projects into a recess 184 which contains a compression spring 185 which exerts its force against the pin 183. In this manner the short arm 180 and the star wheel 177 carried thereon are pressed downwardly by the spring 185 to provide a yieldable engagement between the star wheel and its contacting mandrel 23 and thus insure full contact between the star wheel pocket and the mandrel behind the thin walled container body A on the mandrel.

The slide bar 181 is mounted in slide bearings 186 on the machine frame 107. The opposite end of the bar is connected by a link 187 to an actuating arm 188 pivotally mounted on the frame. Intermediate its length, the arm 188 is connected by a link 189 to a pivotally mounted compound lever 190 having a cam roller 191 which operates in a cam groove of a face cam 192 mounted on and rotating with the main drive shaft 114 (see also FIG. 2).

Thus as the cam 192 rotates in time with the other moving parts of the machine, it reciprocates the slide rod 181 and the star wheel 177 connected thereto, at the proper time to strip the printed body A entirely off the mandrel 23 to a suitable place of discharge, preferably a transfer conveyor or the like.

Figure 4:
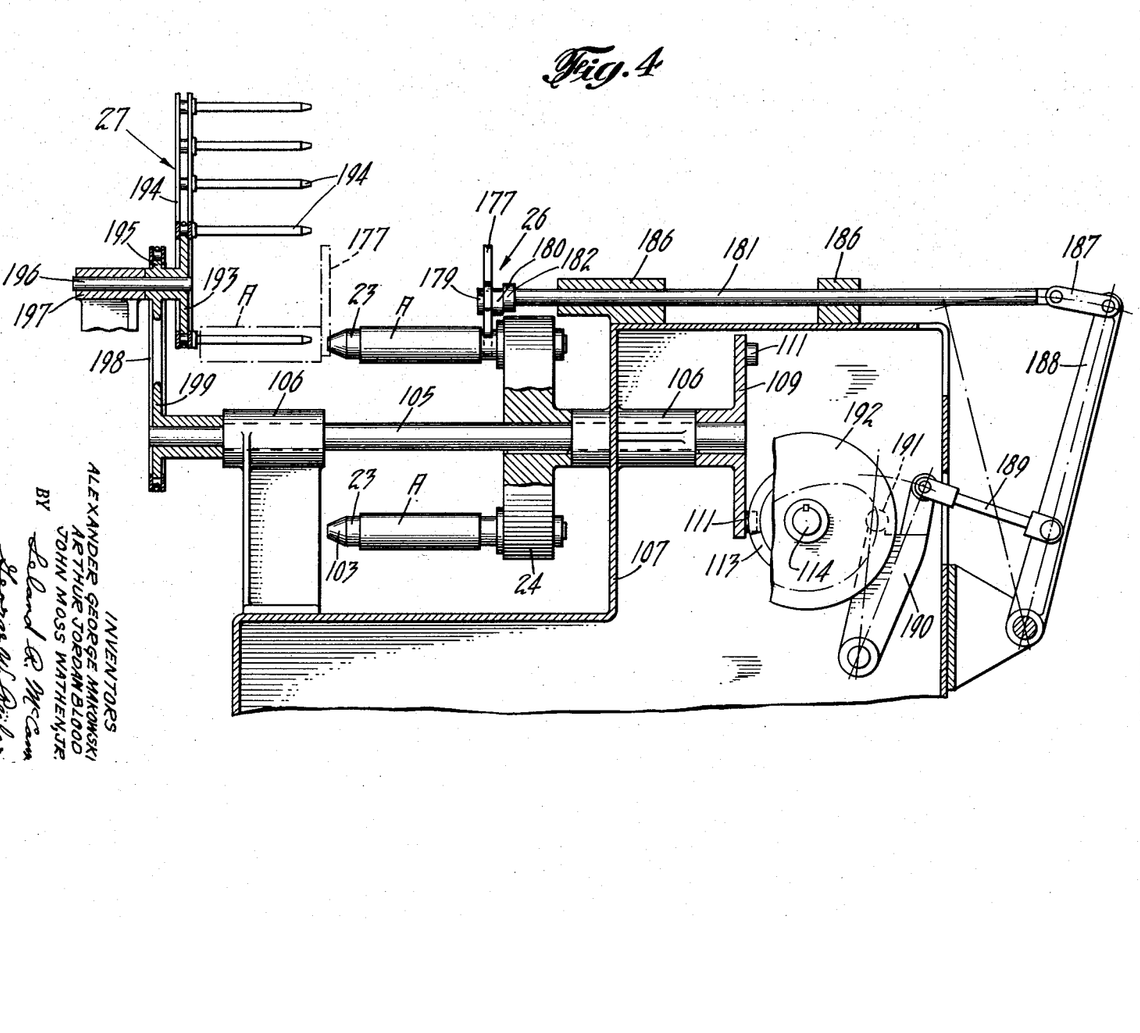

By way of example, FIG. 4 of the drawings illustrate a transfer conveyor 27 which comprises an endless chain 193 having spaced prongs 194 secured thereto. The chain 193 operates over a sprocket 194 having a drive sprocket 195 attached thereto. The sprockets 194, 195 are mounted on a shaft 196 journaled in a bearing 197 and driven by an endless chain 198 which operates over the sprocket 195 and a drive sprocket 199 on the indexing disc shaft 105. Thus the transfer conveyor 27 is actuated intermittently in time with the indexing of the mandrel disc 24 so that the prongs 194 on the conveyor move in succession into axial alignment with the mandrels 23 as the latter are indexed into the discharge station to facilitate transfer of the printed bodies A from the mandrels to the prongs. The transfer conveyor 27 carries the printed bodies A to any suitable place of deposit.

This completes a cycle of operation of the apparatus.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. An apparatus for handling and treating sleeves, comprising a mandrel having an outside diameter substantially equal to the inside diameter of the sleeves to be treated for receiving and firmly holding a sleeve thereon, means for telescoping a sleeve over said mandrel, means for moving said mandrel bodily along a circular path of travel, means for treating the sleeve on the mandrel, a rotatably mounted star wheel engageable by said mandrel and having pockets rotatable into contiguous surrounding relation to said mandrel through said engagement, means for reciprocating said star wheel along said mandrel to strip said sleeve therefrom, and a yieldable mounting between said star wheel and said reciprocating means for yieldably pressing said star wheel against said mandrel.

2. An apparatus of the character defined in claim 1 wherein there is provided transfer means disposed in opposed relation to said star wheel for receiving a stripped off sleeve from said mandrel.

3. An apparatus for handling and treating sleeves comprising a mandrel having an outside diameter substantially equal to the inside diameter of the sleeves to be treated for receiving and firmly holding a sleeve thereon in telescoping relation, conveyor means for supporting a procession of sleeves in end-to-end relation for advancing sleeves toward said mandrel, a stop element disposed adjacent said conveyor means to arrest advancement of said procession of sleeves, a pressure member disposed adjacent said conveyor means for engaging said sleeves behind the leading sleeve of said procession to hold back said procession of sleeves, means for actuating said stop element and said pressure member in timed relation, a sleeve locating hopper intermediate said mandrel and said conveyor means for receiving said leading sleeve, finger means reciprocable between said conveyor means and said hopper for conveying said leading sleeve to said hopper, a pusher head disposed in said hopper and reciprocable relative to said mandrel to advance said sleeve in said hopper to a position on said mandrel, means for reciprocating said pusher head, means for treating the sleeve on the mandrel, and means for stripping the sleeve from the mandrel.

4. An apparatus of the character defined in claim 3 wherein said finger means is a pair of spring-loaded, pivoted fingers, and which includes a movable support for said fingers, means for reciprocating said support, and stationary cam means disposed adjacent the path of travel of said fingers for closing said fingers on said leading sleeve to pick up and carry said sleeve and for opening said fingers to release said picked up sleeve to said hopper.

5. An apparatus for handling headless sleeves comprising a mandrel having an outside diameter substantially equal to the inside diameter of the sleeves for receiving and firmly holding a sleeve thereon in telescoping relation, means to progress said mandrel through a series of stations, a reciprocable pusher member at one of said stations for telescoping a sleeve on said mandrel, a locating member at another station disposed in axial alignment with said mandrel and reciprocable toward and away from said mandrel through a predetermined stroke to effect precise location of the sleeve on and along said mandrel, and a pusher ring on the inner end of said locating member having an inner circumferential surface capable of relatively close fitting engagement with said mandrel and having a face engageable with an end of said sleeve in an all-around fashion to protect said sleeve against distortion during said locating operation.

6. An apparatus for handling headless sleeves comprising a mandrel having an outside diameter substantially equal to the inside diameter of the sleeves for receiving and firmly holding a sleeve thereon, means for telescoping a sleeve over said mandrel, means for advancing said mandrel through a plurality of stations, a star wheel at one of said stations engageable with said mandrel beyond the sleeve thereon for stripping the sleeve from said mandrel, a slide bar for reciprocating said star wheel and a yieldable mounting interposed between said star wheel and said slide bar for yieldably pressing said star wheel against said mandrel.

7. An apparatus for handling sleeves comprising conveyor means for supporting a procession of sleeves in end-to-end relation and tending to advance the procession in one direction, a movable stop element disposed adjacent said conveyor means to arrest advancement of the procession in said one direction, means for engaging the sleeve behind the leading one to hold back the procession, means for actuating said stop element and engaging means in sequence so timed as to hold back the procession whenever the stop element is withdrawn, finger means reciprocable in a direction lengthwise of said procession between said conveyor means and a deposit location spaced forwardly thereof for grasping the leading sleeve, separating it from the procession and dropping it at said deposit location, and means to operate said finger means in timed relation with said stop element to grasp the leading sleeve while the stop element is acting and move the leading sleeve after the stop element is withdrawn.

8. An apparatus of the character defined in claim 7 wherein said finger means is a pair of spring-loaded, pivoted fingers, and which includes a movable support for said fingers, means for reciprocating said support, and stationary cam means disposed adjacent the path of travel of said fingers for closing said fingers on said leading sleeve to pick up and carry said sleeve and for opening said fingers to release said picked up sleeve to said hopper.

9. An apparatus of the character defined in claim 8 in which the spring loading for said fingers has an over-center property whereby the fingers will snap to open and closed positions, and said cams are short sloping surfaces acting briefly on the fingers only adjacent the ends of their reciprocatory stroke.

References Cited in the file of this patent

UNITED STATES PATENTS

| | | |
|---|---|---|
| 913,285 | Harbeck | Feb. 23, 1909 |
| 1,546,564 | Cameron | July 21, 1925 |
| 1,910,712 | Prussing | May 23, 1933 |
| 1,947,171 | Prussing | Feb. 13, 1934 |
| 1,992,634 | Prussing | Feb. 26, 1935 |
| 2,031,727 | Niemand | Feb. 25, 1936 |
| 2,175,560 | Frieden | Oct. 10, 1939 |
| 2,309,696 | Frieden | Feb. 2, 1943 |
| 2,395,146 | Ray | Feb. 19, 1946 |
| 2,620,609 | Pope | Dec. 9, 1952 |
| 2,835,371 | Davis | May 20, 1958 |
| 2,856,058 | Todd et al. | Oct. 14, 1958 |
| 2,950,671 | Allen et al. | Aug. 30, 1960 |